United States Patent
Gosling

(10) Patent No.: US 6,840,726 B2
(45) Date of Patent: Jan. 11, 2005

(54) TENSIONING APPARATUS AND METHOD

(75) Inventor: Martin Charles Gosling, Burnstown (CA)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 10/320,775

(22) Filed: Dec. 16, 2002

(65) Prior Publication Data

US 2004/0115023 A1 Jun. 17, 2004

(51) Int. Cl.$^7$ .......................... F16B 31/00; F16B 21/00
(52) U.S. Cl. ...................... 411/14.5; 411/339; 403/31
(58) Field of Search ........................ 411/14.5, 916, 411/917, 339, 511, 512; 403/5, 31; 785/97, 106

(56) References Cited

U.S. PATENT DOCUMENTS

| | | | | |
|---|---|---|---|---|
| 2,840,399 A | * | 6/1958 | Harless et al. ............ 403/15 |
| 2,992,479 A | * | 7/1961 | Musser et al. ............ 29/421.1 |
| 3,216,540 A | | 11/1965 | Blinn |
| 3,326,585 A | | 6/1967 | Piecha et al. |
| 3,494,642 A | * | 2/1970 | Brown et al. ............ 285/329 |
| 3,698,750 A | * | 10/1972 | Eastcott et al. ............ 403/15 |
| 3,707,107 A | * | 12/1972 | Bieri ............ 411/423 |
| 3,837,694 A | * | 9/1974 | Frisch et al. ............ 292/256.75 |
| 3,947,948 A | | 4/1976 | Fredriksson et al. |
| 4,093,052 A | * | 6/1978 | Falk ............ 192/88 B |
| 4,105,343 A | | 8/1978 | Riegler et al. |
| 4,124,230 A | * | 11/1978 | Ahlstone ............ 285/18 |
| 4,192,621 A | | 3/1980 | Barth |
| 4,249,718 A | | 2/1981 | Heaton |
| 4,315,446 A | | 2/1982 | Orban |
| 4,375,926 A | * | 3/1983 | Feller ............ 403/15 |
| 4,523,742 A | | 6/1985 | Reneau |
| 4,525,916 A | | 7/1985 | Wuhrer |
| 4,535,656 A | | 8/1985 | Orban |
| 4,569,258 A | | 2/1986 | Orban |
| 4,569,506 A | | 2/1986 | Vassalotti |
| 4,659,065 A | | 4/1987 | Simms |
| 4,708,036 A | | 11/1987 | Vossbrinck |
| 4,773,146 A | | 9/1988 | Bunyan |
| 4,844,418 A | | 7/1989 | Cole |
| 4,846,444 A | | 7/1989 | Vassalotti |
| 4,861,181 A | | 8/1989 | Sundberg |
| 4,981,404 A | | 1/1991 | Chamberlain et al. |
| 4,998,453 A | | 3/1991 | Walton et al. |

(List continued on next page.)

OTHER PUBLICATIONS

Hydraulics Technology, Inc. HTI's Variable Stud Tensioner is Versatile. www.htico.com.
Hydraulics Technology, Inc. HTI's Fixed Stud Tensioner is Compact & Economical. www.htico.com.

(List continued on next page.)

Primary Examiner—Flemming Saether

(57) ABSTRACT

A tensioning apparatus (40) for applying a closing force across a flange assembly (42). The tensioning apparatus includes a shank member (44) and an annular member (48) connected to the shank member by an interference fit. The interference fit may be selectively relaxed by applying a fluid pressure ($P_1$) to a groove (54) between the annular member and the shank member. A tensioner (58) is used to pre-load the shank member by pulling on the shank member while pushing on the annular member while the interference fit is sufficiently relaxed to allow relative movement between the annular member and the shank member. Once the pre-load is established, the interference fit is reestablished by releasing pressure $P_1$ to lock the annular member in position for maintaining the closure force across the flange assembly after the tensioner is removed. A lock nut (34) may be tightened against the annular member to provide additional protection against the release of the pre-load. Seals (146) may be used to minimize leakage of the fluid used for applying the fluid pressure between the annular member and the shank member.

13 Claims, 3 Drawing Sheets

U.S. PATENT DOCUMENTS

| | | | |
|---|---|---|---|
| 5,527,015 A | | 6/1996 | Percival-Smith |
| 5,538,379 A | | 7/1996 | Junkers |
| 5,690,458 A | | 11/1997 | Junkers |
| 5,803,436 A | | 9/1998 | Hohmann et al. |
| 5,842,263 A | | 12/1998 | Goslilng |
| 5,865,070 A | * | 2/1999 | Bornhorst et al. ............ 74/603 |
| 5,878,490 A | | 3/1999 | Heinold et al. |
| 5,927,157 A | | 7/1999 | Gosling |
| 5,951,222 A | | 9/1999 | Gosling |
| 6,065,737 A | | 5/2000 | Richardson et al. |
| 6,085,929 A | | 7/2000 | Malsbury et al. |
| 6,167,764 B1 | | 1/2001 | Calhoun |
| 6,223,925 B1 | | 5/2001 | Malsbury et al. |
| 6,676,323 B2 | * | 1/2004 | Oen ............................ 403/31 |

OTHER PUBLICATIONS

Hydraulics Technology, Inc. HTI Hydraulic Nuts are Compact, Easy to Use and Accurate. www.htico.com.

Hydraulics Technology, Inc. HTI SubSea Tensioners are Diver Friendly. www.htico.com.

Riverhawk Company. Hydraulic Torque Coupler. www.riverhawk.com.

Riverhawk Company. Riverhawk Hydraulic Tensioner Nut Application Guide. www.riverhawk.com.

Riverhawk Company. Riverhawk Het Series External Stud Tensioner Application Guide. www.riverhawk.com.

SKF Hydraulic Assisted Adapter Sleeve. www.skfusa.com.

SM1011 Computerised Thick Cylinder. www.tecquip.com.

Superbolt Products. www.superbolt.com.

Precision Bolting, Ltd. Superbolt Products and Taper Line® Products. www.precisionbolting.com.

VM25: Stresses in a Long Cylinder. http://sun1.rrzn–user.uni–hannover.de.

VM38: Plastic Loading of a Thick–Walled Cylinder. http://www1.ansys.com.

* cited by examiner

TENSIONING APPARATUS AND METHOD

FIELD OF THE INVENTION

This application relates generally to the field of fasteners, and more specifically to an apparatus and method for tensioning a bolt, stud or similar tension member.

BACKGROUND OF THE INVENTION

A variety of tensioning systems have been devised for imparting a desired amount of closing force to a bolted flange arrangement. For example, a nut may be tightened onto a bolt with a predetermined amount of torque. The accuracy of this method depends upon knowing the amount of friction developed between the nut and the underlying surface, among other factors.

Hydraulic tensioning systems are used to apply a predetermined amount of tensile force to a bolt; with a nut then being positioned on the bolt to maintain the tensile force after the hydraulic tensioning system is removed. The amount of tensile force may be determined by measuring the pressure in the hydraulic system or by measuring the elongation of the bolt. The reactive load applied by a hydraulic tensioning system is carried to the underlying flange surface through a stand that surrounds the bolt and nut. Access to the nut is provided through windows formed in the stand. Such systems are available through Hydraulics Technology, Inc. (www.htico.com)

In applications where there is insufficient room to use a hydraulic tensioning system, a special hydraulic nut may be used. A hydraulic nut includes an internal piston/cylinder arrangement that allows the nut to expand axially in response to an applied hydraulic pressure, thereby tensioning the engaged bolt. A mechanical portion of the nut is then tightened to hold the nut in its expanded condition after the hydraulic pressure is removed. Such devices are expensive and may depend upon highly precise metal-to-metal seals for high temperature applications. Such devices are available through Riverhawk Company. (www.riverhawk.com)

An alternative to the hydraulic nut is the jackbolt tensioner. A torque nut is applied to a hand-tight condition. A plurality of jackbolts are threaded through the torque nut to push the torque nut away from the flange surface to tension the bolt. A hardened washer is placed between the jackbolts and the flange surface to protect against load harmful load concentrations. Such devices are available through Superbolt, Inc. (www.superbolt.com)

SUMMARY OF THE INVENTION

There is an ongoing need for improved bolting systems and methods that are simple to manufacture and inexpensive to use, that require little or no space around the nut to apply, that reduce the likelihood of galling and thread damage, and that reduce the level of stress in the fastener and in the underlying flange.

A tensioning apparatus is described herein as including: a shank member; an annular member defining an opening for receiving a portion of the shank member, the opening sized to provide an interference fit between the annular member and the shank member for resisting relative motion there between; and a fluid passageway for conveying fluid pressure between the shank member and the annular member to selectively expand the annular member for relaxing the interference fit. The fluid passageway may be formed through the annular member or through the shank member.

A tensioning apparatus is further described herein as including: a shank member comprising a means for transferring force against a first side of a flange assembly; an annular member defining an opening for receiving the shank member, the opening sized to provide an interference fit between the annular member and the shank member; a supply of pressurized fluid conveying a fluid pressure into the opening to selectively expand the annular member to relax the interference fit; and a tensioner tool for imparting a tensile load into the shank member by pulling on the shank to impart force against the first side of the flange assembly while pushing against a second opposed side of the flange assembly through the annular member.

A tensioning apparatus is also described herein as including: a stud; a nut attached to the stud by an interference fit for resisting relative motion there between under the influence of a tensioning force; and a means for conveying a fluid pressure between the nut and the stud to selectively expand the nut to relax the interference fit sufficiently to allow relative motion between the nut and the stud under the influence of the tensioning force. The means for conveying a fluid pressure may include a fluid passageway formed in the nut or formed in the stud. The tensioning apparatus may further include a means for pulling on the stud while pushing directly against the nut to apply the tensioning force. The means for applying a fluid pressure may further include seals to minimize the leakage of pressurized fluid.

BRIEF DESCRIPTION OF THE DRAWINGS

These and other advantages of the invention will be more apparent from the following description in view of the drawings that show.

DETAILED DESCRIPTION OF THE INVENTION

The term "stud" when used herein is meant to include elongated tension members such as bolts, studs, screw-threaded rods and the like whether or not they include an integral head or threads. A stud includes a shank having opposed ends, with each end having a mechanism for applying respectively opposed forces across a joint to produce a tension load in the shank. Such mechanisms may include an integral head or threads for threaded connection with a threaded nut.

Figure 1:
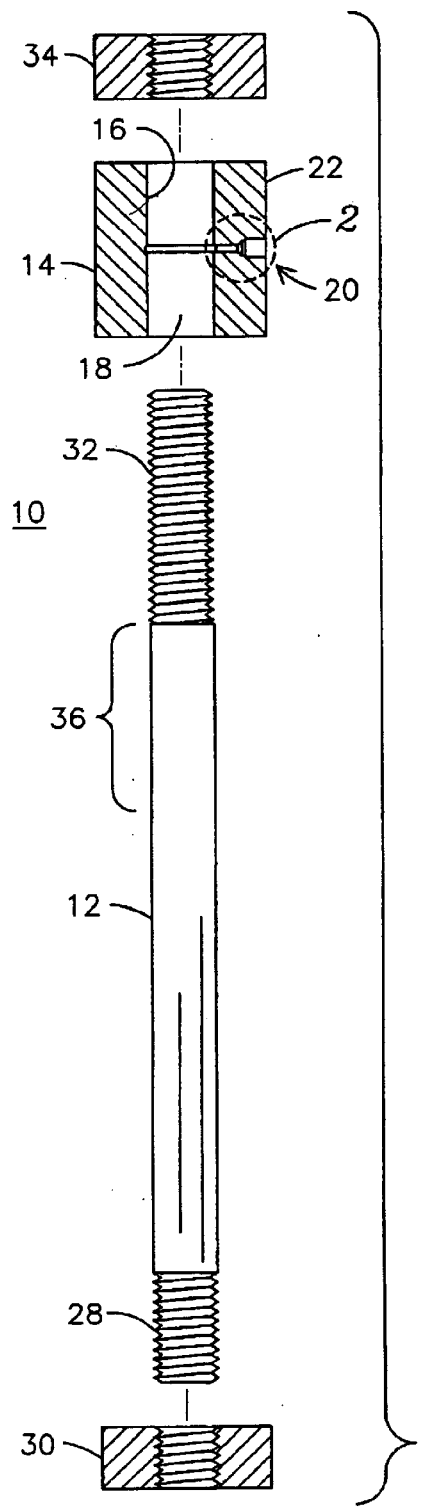
FIG. 1 is an exploded view of a tensioning apparatus including an annular nut member attachable to a shank member by an interference fit.

FIG. 1 illustrates a tensioning apparatus 10 including a shank member 12 and an annular member 14. The annular member 14 has an inside surface 16 defining an opening 18 for receiving the shank member 12, with the opening 18 being sized to provide an interference fit connection between the shank member 12 and the annular member 14. The shank member 12 functions as a stud and the annular member 14 functions as a nut because it grips the stud to transfer a tensile force across a flanged joint. However, the shank member 12 and annular member 12 lack the mating threads that are normally found in a typical prior art stud/nut arrangement. Rather, the interference fit between the shank member 12 and the annular member 14 provides sufficient friction for resisting relative motion there between when the shank member 12 is placed into tension by the annular member 14.

Figure 2:
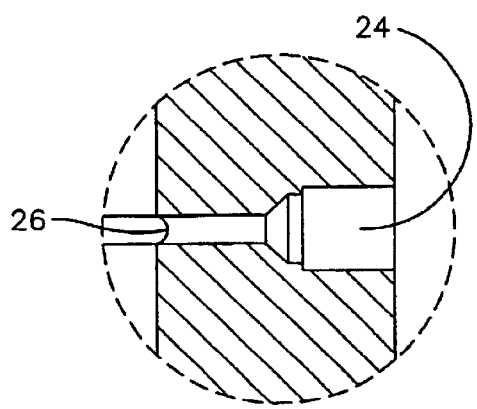
FIG. 2 is an expanded view of the details of a fluid passageway formed in the annular nut member of FIG. 1.

In order to facilitate a flange tensioning process using the tensioning apparatus 10, a means is provided for conveying fluid pressure into the opening 18 to selectively expand the annular member 14 to relax the interference fit, thus selectively allowing relative motion between the annular member 14 and the shank member 12 as the shank member 12 is pre-tensioned. One such means is illustrated in FIG. 1 as a fluid passageway 20 formed through the annular member 14 from an outside surface 22 of the annular member 14 to the inside surface 16. As can be seen most clearly in the expanded view provided in FIG. 2, fluid passageway 20 includes a hole 24 formed from the outside surface 22 to the inside surface 16 and a groove 26 formed along the inside surface 16 to be in fluid communication with the hole 24. The hole 24 is connected to a supply of pressurized fluid. Groove 26 extends 360° around the circumference of opening 18 to apply the fluid pressure evenly around the circumference of the inner surface 16. One or a plurality of interconnected grooves 26 may be formed along the inside surface 16 to direct the fluid pressure across an appropriate area of the inside surface 16 so that the annular member 14 may be selectively expanded an amount sufficient to allow movement along shank member 12 without creating unacceptably high stress concentrations within the annular member 14 or shank member 12.

Tensioning apparatus 10 may be made from any appropriate material and may have any size required for a particular application, using materials and stress calculations known in the art. A desired clamping force is generally determined first, then a size and material selected for shank member 12 to accommodate the clamping force. In this embodiment, shank member is formed as a stud with no integral head. Threads 28 are formed on a first end of shank member 12 for receiving a mating threaded nut 30. Alternatively, an integral bolt head (not shown) may be formed on this end of the shank member 12. Threads 32 are also formed on the opposed second end of shank member 12 for engagement with a hydraulic tensioner, as will be described more fully below. These threads 32 may also be used to engage a threaded lock nut 34 positioned to be in contact with the annular member 14 as a secondary back-up support in the event of slippage of the interference fit once the shank member 12 is tensioned against the annular member 14.

A portion 36 of the shank member 12 where the annular member 14 will reside during use will have a diameter that interfaces with the corresponding diameter of the opening 18 to maintain the desired interference fit. The mating portion 36 of the shank member 12 may be finished machined to a desired diameter with a desired surface finish, and then the bore opening 18 of the annular member 14 may be ground to suit so that the interference fit can be carefully controlled. Alternatively, the diameter of the shank member 12 may be controlled to match the inside bore opening 18 of an annular member 14. In an exemplary embodiment using a shank member 12 having a diameter of approximately 1.5 inches, the diameter of opening 18 (excluding the groove 26) may be formed to a diameter that is between 0.0035–0.0037 inches less than portion 36 of the shank member (nominal 3.6 mils interference). Interference fits of 0.001–0.004 inch per inch of stud diameter may typically be used depending upon the application. The interference is selected to provide sufficient frictional resistance plus a desired margin to adequately support the shank pre-load once the tensioning apparatus 10 is assembled and tensioned across a joint. The necessary interference may be calculated by one skilled in the art using known Compound Thick Cylinder Theory calculations as are explained in many mechanics textbooks. (for example, "The Mechanics of Materials" by Lancaster & Mitchell, published by McGraw-Hill Publishing Company, 1967) The initial assembly of the annular member 14 onto the shank member 12 can be accomplished at the point of manufacture or elsewhere by heating the annular member 14 (and/or cooling the shank member 12) a sufficient amount to allow thermal expansion/contraction to overcome the interference and to allow the annular member 14 to be positioned over the critical diameter portion 36. Once the parts thermally equilibrate to ambient temperature, the interference fit is reestablished. A thermal gradient may also be used to relax the interference fit during the pre-loading of the tensioning apparatus 10 in lieu of a pressure gradient, however, the simplicity, speed and controllability of a pressure-based system makes it preferred over such a temperature-based system.

Figures 3, 4:
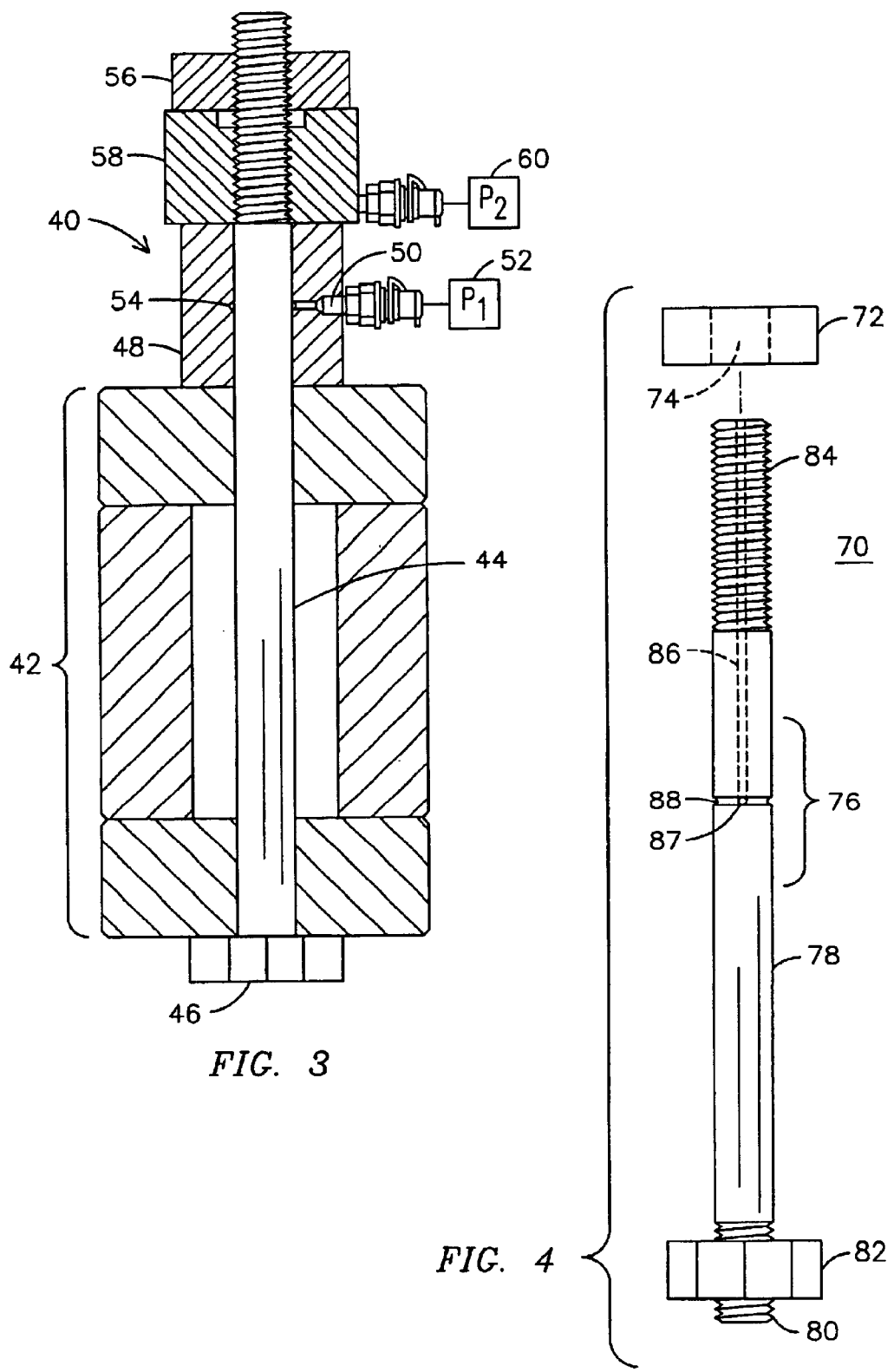
FIG. 3 is a sectional view of a tensioning apparatus being installed onto a flange assembly using a hydraulic tensioner that applies the tensile force through the unthreaded annular nut member.
FIG. 4 is an exploded view of a tensioning apparatus including a shank member having a fluid passageway used for selectively expanding and an interference fit with an annular member.

FIG. 3 illustrates a tensioning apparatus 40 being installed across a flange joint assembly 42. The tensioning apparatus 40 includes a shank member 44 having an integrally formed head 46. The head 46 functions as a means for transferring force against a first side of the flange assembly 42. Alternatively, threads and a removable nut, with or without a washer, may provide this function in order to simplify the installation of the tensioning apparatus 40 into the flange joint assembly 42. The shank member 44 may also be threaded into a threaded hole in the flange. The shank member 44 passes through the flange joint assembly 42 and is captured at ambient temperatures by an interference fit with an annular member 48. Annular member 48 includes a fluid passageway 50 for conveying fluid pressure $P_1$ from a supply of pressurized fluid 52 into an opening such as groove 54 between the annular member 48 and the bolt 44 for selectively expanding the annular member 48 to relax the interference fit. A tensioner nut 56 is threaded onto the distal end of the shank member 44 opposed the head 46, and a tensioner 58 is positioned between the tensioner nut 56 and the annular member 48. Tensioner 58 may be a mechanical device or a commercially available hydraulic tensioner that is powered by pressure $P_2$ from a source of hydraulic pressure 60. The fluid connections may be made through quick release high-pressure fittings as are known in the art. The flange joint assembly 42 is closed and tensioned by applying pressure $P_2$ to tensioner 58 to cause axial expansion between tensioner nut 56 and annular member 48 while pressure $P_1$ is applied to relax the interference fit so that shank member 44 is free to slide axially within the annular member 48 as shank member 44 is pre-loaded and stretched. When the annular member 48 expands, there may be some leakage of the fluid used to provide pressure $P_1$ from between the two mating surfaces. However, by positioning groove 54 proximate the axial center of annular member 48, such leakage may be minimized since the pressure will cause annular member 48 to expand somewhat more near its center, thus allowing the opposed axial ends of the mating surfaces to maintain light contact for limiting fluid leakage. Once a desired amount of tensile force is developed in bolt 44, the pressure $P_1$ is dropped to zero to re-establish the interference fit in order to hold the pre-load, and then pressure $P_2$ is dropped to zero and tension nut 56 and tensioner 58 are removed. The pre-load can be released without the use of tensioner 58 by simply providing pressure $P_1$ to the fluid passageway 50 to allow annular member 48 to expand and to slide axially along shank member 44. A backup nut may be threaded onto the bolt 44 to make contact with annular member 48 once tensioner nut 56 and tensioner 58 are removed in order to provide added assurance against an unintentional release of the pre-load.

Advantageously, the tensioner 58 applies the reaction force for the tension preload directly through the annular member 48 without the need for a bridge, jackbolts, or a complicated multi-piece nut assembly. The tensioner tool 58 pulls on the shank member 44, either directly or through a tensioner nut 56 as in this embodiment, to impart force against the far side of the flange assembly 42 while pushing against the near side of the flange assembly 42 through the annular member 48. Forces are thus imparted on the flange assembly 42 during the tensioning process in the same location and in the same manner as such forces are imparted when the flange assembly 42 is in use. Furthermore, annular member 58 contains no elaborate internal seals and no critical load-bearing threads within the tensioning apparatus load path. The absence of load-bearing threads and jackbolts keeps stresses in the various parts to a generally low level without deleterious stress concentrations.

FIG. 4 illustrates another embodiment of a partially assembled tensioning apparatus 70 having an annular member 72 defining an opening 74 (hidden but shown in phantom) sized to have an interference fit with a mating portion 76 of a shank member 78. The shank member 78 is a stud with a threaded end 80 engaged with a nut 82 and an opposed threaded end 84 available for engagement with a hydraulic tensioner (not shown). In this embodiment, a fluid passageway is formed to include an axial hole 86 extending from an end of the shank member 78 and intersecting a radial hole 87. The radial hole 87 extends to intersect a groove 88 formed along the outside surface of the shank member 78 within the mating portion 76. A fluid pressure may be applied through the fluid passageway 86, 87, 88 to selectively expand annular member 72 sufficiently to relax the interference fit.

Figure 5:
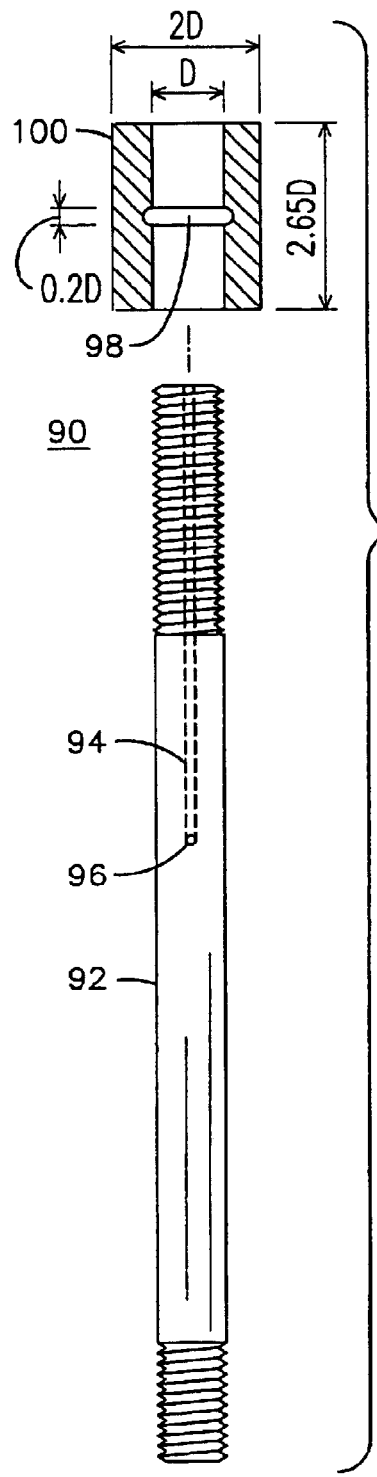
FIG. 5 illustrates a tensioning apparatus including a shank member having a fluid passageway opening into a groove formed in the bore of an annular member.

FIG. 5 illustrates another embodiment of a tensioning apparatus 90 including a stud shank member 92 having an internally formed fluid passageway 94. The fluid passageway 94 extends along the axial length of the shank member 92 (seen in phantom) to a radial hole 96. The passageway 94 is in fluid communication with groove 98 formed 360° circumferentially around the inside surface of the annular member 100. When annular member 100 is in position with an interference fit around shank member 92, the groove 98 will be aligned with hold 96 and in fluid communication with fluid passageway 94. Groove 98 has an axial extent that is sufficient to permit axial movement between annular member 100 and shank member 92 during tensioning of shank member 92 while still maintaining fluid communication between fluid passageway 94 and groove 98. In one embodiment, for a shank member 92 having diameter D, annular member may have diameter of approximately 2D and a height of approximately 2.65D, and groove 98 may have an axial extent of approximately 0.2D.

Figure 6:
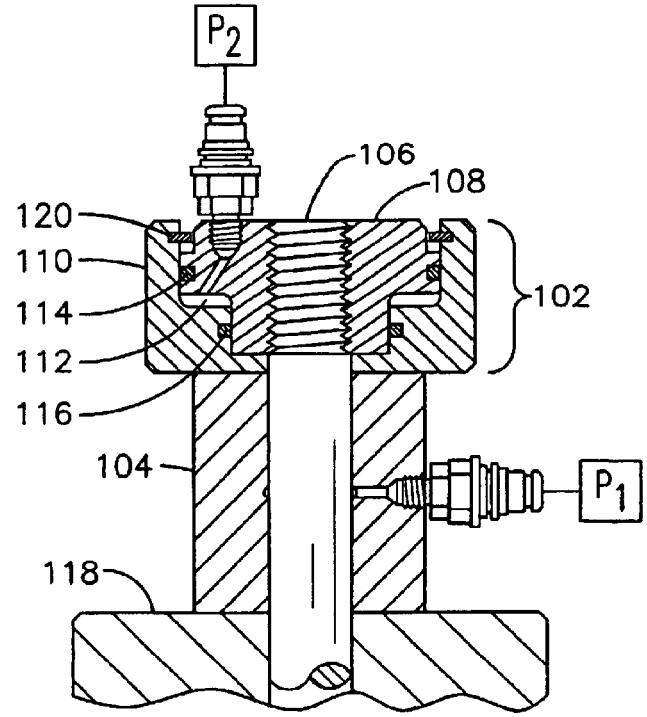
FIG. 6 is a cross-sectional view of a low-profile tensioner bearing upon an annular member to perform a tensioning operation while the annular member is expanded to relax its interference fit with a shank member.

FIG. 6 illustrates the use of a low-profile tensioner 102 that bears upon an annular member 104 to perform a tensioning operation while the annular member 104 is expanded by an applied hydraulic pressure $P_1$ to relax its interference fit with a shank member 106. The tensioner 102 includes a piston portion 108 threadably engaged with shank member 106 and moveable within a cylinder portion 110 in response to fluid pressure $P_2$. The fluid pressure is maintained in pressure chamber 112 by upper seal 114 and lower seal 116, causing piston 108 to move upward to pre-load shank member 106 and flange while applying a reaction force downward directly against annular member 104. Sample calculations performed for a shank member having a diameter of 1.5 inch demonstrate that a shank preload of 45,000 psi can be achieved with a working pressure $P_2$ of 20,000 psi and a tensioner piston area of 3.976 in$^2$. This arrangement requires an inner seal diameter of 2.25 inch and an outer seal diameter of 3.182 inch, and a tensioner outside diameter of 3.8 inches. Shank elongation of 0.023 inches is required to achieve the target preload with a shank effective length of 15.25 inches, and this would necessitate an overall height of the tensioner 112 of only about 1.5 inches. Retainer 120 may accommodate a conservative overall piston travel limit of 0.1875 inch to keep piston 108 and cylinder 110 together when not in use. With annular member 104 having a nominal diameter of 3 inches, the nut contact stress would be 15,000 psi.

Figure 7:
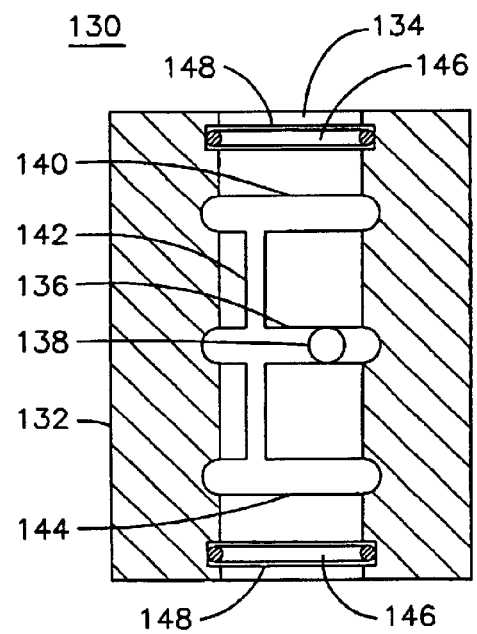
FIG. 7 is a cross-sectional view of an annular member having a plurality of grooves along its bore and having seals at opposed ends of the bore.

FIG. 7 is a cross-sectional view of an annular member 130 that may be used with a tensioning apparatus as described above. The annular member 130 includes an outside surface 132 and an inside surface 134 defining a generally cylindrical bore for accepting a shank member in an interference fit. A plurality of grooves are formed along the inside surface 134. A first groove 136 is formed along an axial centerline of the annular member 130 and is in fluid communication with a hole 138 used to deliver a fluid pressure into the bore. A second groove 140 is formed to be essentially parallel to the first groove 136 and is in fluid communication with the first groove 136, such as by being interconnected therewith via longitudinal groove 142. Additional axial and longitudinal grooves may be provided as desired to achieve a desired distribution of the pressure applied through hole 138 across the bore. The grooves are shaped to avoid stress concentrations, for example by having a radius (e.g. 0.06 inch) that is greater than a depth (e.g. 0.04 inch) so that the edges form less than a right angle. The edges may be given a further radius (e.g. 0.02 inch) to eliminate any sharp edge. In one embodiment, three axial grooves 136, 140, 144 are interconnected by two longitudinal grooves 142 that are diagonally opposed from each other and equally spaced from hole 138. Grooves 140, 144 may be located closer to their respective axial ends of annular member 130 than to groove 136 located at the axial centerline in order to facilitate the expansion of the bore over the majority of its length, leaving only relatively small end areas of the insider surface 134 to function as a seal for maintaining the pressure within the bore. In one embodiment for an annular member 130 having an axial length of 4 inches, the end grooves 140, 144 may be axially removed from the axial centerline groove 136 by about 1.2 inches respectively, leaving about 0.8 inches from the centerlines of grooves 140, 144 to the respective axial ends of the annular member 130.

In order to reduce or to eliminate leakage of the pressurized fluid from between the annular member 130 and a mating shank member (not shown in FIG. 7) when the bore is pressurized during a tensioning operation, it may be desired to add a seal 146 at opposed axial ends of the bore. O-ring seals 146 are illustrated as being inserted into respective grooves 148 formed along the inside surface 134 of the annular member. Alternatively, such grooves may be formed in the mating shank member. Other types of seals may be used, for example lip seals, bellows seals, spring seals, brush seals, etc. and they may be formed of any known material appropriate for the environmental conditions of the particular application. Such seals are preferably located close to the axial ends of the annular member 130, for example 0.1 inch on center from the respective end.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

I claim as my invention:

1. A tensioning apparatus comprising:
a shank member comprising a means for transferring force against a first side of a flange assembly;
an annular member defining an opening for receiving the shank member, the opening sized to provide an interference fit between the annular member and the shank member;
a supply of pressurized fluid conveying a fluid pressure into the opening to selectively expand the annular member to relax the interference fit; and
a tensioner tool for imparting a tensile load into the shank member by pulling on the shank member to impart force against the first side of the flange assembly while pushing against a second opposed side of the flange assembly through the annular member.

2. The tensioning apparatus of claim 1, further comprising a fluid passageway formed through the annular member from an outside surface of the annular member to the opening for conveying the fluid pressure from the supply of pressurized fluid to the opening.

3. The tensioning apparatus of claim 1, further comprising a fluid passageway formed through a portion of the shank member for conveying the fluid pressure from the supply of pressurized fluid to the opening.

4. The tensioning apparatus of claim 1, wherein the tensioner tool comprises a hydraulic tensioner.

5. The tensioning apparatus of claim 1, further comprising a seal disposed between the shank member and the annular member.

6. A tensioning apparatus comprising:
a stud extending through an aperture in a first side of an assembly;
an annular member attached to the stud by an interference fit for resisting relative motion there between under the influence of a tensioning force transferred against the first side of the assembly;
a means for applying a fluid pressure between parallel opposed axial surfaces of the annular member and the stud to generate a raidial force with no axial force component to selectively expand the annular member to relax the interference fit suffiently to allow relative motion between the annular member and the stud under the influence of the tensioning function force; and 7. The tensioning apparatus of claim 6, wherein the means for applying a fluid pressure comprises a fluid passageway formed in the annular member.

8. The tensioning apparatus of claim 6, wherein the means for applying a fluid pressure comprises a fluid passageway formed in the stud.

9. The tensioning apparatus of claim 6, wherein the means for applying a fluid pressure comprises a groove formed around an inside surface of the annular member.

10. The tensioning apparatus of claim 6, wherein the means for applying a fluid pressure comprises a groove formed around an outside surface of the stud.

11. The tensioning apparatus of claim 6, wherein the means for applying a fluid pressure comprises:
a first groove formed around an inside surface of the annular member along an annular centerline of the annular member; and
a second groove formed around an inside surface of the annular member parallel to the first groove and disposed closer to an annular end of the annular member than to the first groove.

12. The tensioning apparatus of claim 6, wherein the means for applying a fluid pressure comprises a seal.

13. A tensioning apparatus comprising:
a shank member comprising a longitudinal axis having a length extending through an aperture in an assembly to be tensioned with a tensioning force and having an outside surface having a critical dimension portion parallel to the longitudinal axis;
an annular member comprising an inside surface parallel to the longitudinal axis and defining an opening for receiving the shank member with an interference fit between the inside surface and the critical dimension portion of the outside surface; and
a fluid passageway for conveying a fluid pressure between the outside surface and the inside surface for relaxing the interference fit;
wherein the annular member may be moved to any location along the critical dimension portion when the fluid pressure is applied, and wherein the annular member may be affixed to the shank member by the interference fit at any desired location along the critical dimension portion by relieving the fluid pressure with the annular member at the desired location for resisting relative motion between the shank member and the annular member under the influence of a tensioning force exerted by the assembly;
further comprising a means for pulling on the shank member while pushing against the annular member to generate the tensioning force.

* * * * *

UNITED STATES PATENT AND TRADEMARK OFFICE
CERTIFICATE OF CORRECTION

PATENT NO.    : 6,840,726 B2
DATED         : January 11, 2005
INVENTOR(S)   : Martin Charles Gosling It is certified that error appears in the above-identified patent and that said Letters Patent is hereby corrected as shown below:

<u>Column 8,</u>
Line 7, at the end of the claim, add: -- a means for pulling on the stud while pushing against the annular member to apply the tensioning force. --

Signed and Sealed this

Twenty-fourth Day of May, 2005

JON W. DUDAS
*Director of the United States Patent and Trademark Office*